G. W. Richardson.
Mower.
Nº 50,844.        Patented Nov. 7, 1865.
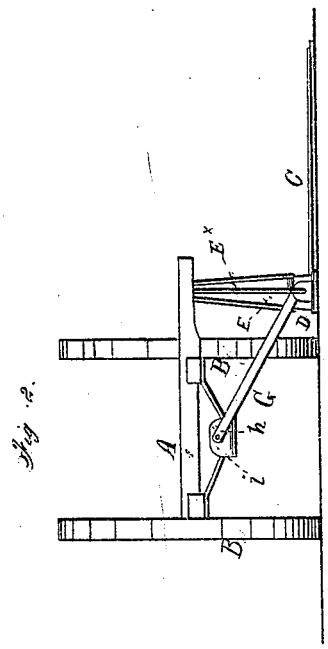
Inventor.
G W Richardson
Witnesses.
Wm Creurn
Thos Lusch
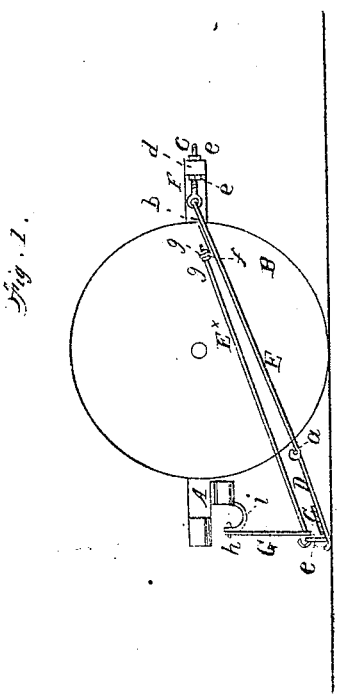
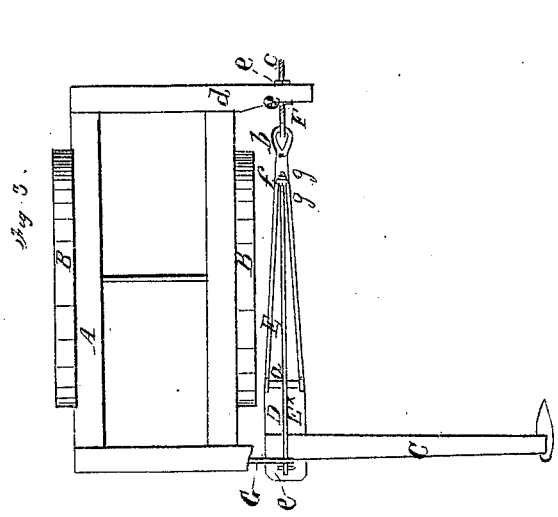

UNITED STATES PATENT OFFICE.

G. W. RICHARDSON, OF GRAYVILLE, ILLINOIS.

IMPROVEMENT IN HARVESTERS.

Specification forming part of Letters Patent No. 50,844, dated November 7, 1865.

*To all whom it may concern:*

Be it known that I, G. W. RICHARDSON, of Grayville, in the county of White and State of Illinois, have invented a new and useful Improvement in Grain and Grass Harvesters; and I do hereby declare that the following is a full, clear, and exact description thereof, which will enable those skilled in the art to make and use the same, reference being had to the accompanying drawings, forming part of this specification, in which—

Figure 1 is a side view of a harvester with my improvement applied to it; Fig. 2, a rear view of the same; Fig. 3, a plan or top view of the same.

Similar letters of reference indicate corresponding parts.

This invention relates to a new and useful improvement in connecting the finger-bar to the main frame of the machine, whereby the points of the fingers or guards, and consequently the points of the cutters of the sickle, may be elevated in a greater or less degree, as circumstances may require, and firmly retained in the position in which they may be set or adjusted.

A represents the main frame of a harvester, and B B the wheels on which it is mounted. These parts may be constructed in the usual manner, and therefore do not require a minute description.

C represents the finger-bar, which may also be constructed in the usual way, and is provided with the ordinary fingers. The inner end of the finger-bar has a short bar, D, firmly attached to it at right angles, and the front end of bar D is connected by a joint, $a$, with a bar, E. The bar E is parallel, or nearly so, with the side of the main frame A, and the front end of the bar E is provided with an eye, $b$, in which an eyebolt, F, is fitted, forming a universal joint. The eyebolt F is provided with a screw-shank, $c$, which passes through the front cross-bar, $d$, of the main frame A, and has two jam-nuts, $e\ e$, upon it, one at the front, and the other at the rear, side of the bar $d$, (see Figs. 1 and 3.) On the rear part of the bar D there is an upright lip, $e'$, in which the rear end of a rod, $E^\times$, is fitted by being bent in hook form or otherwise. The front end of this rod passes through a lip, $f$, on the bar D, and has jam-nuts $g$ upon it, one in front of, and the other at the rear of, the lip.

G represents a bar, one end of which is connected by a pivot, $h$, to a plate, $i$, at the center of the rear of the main frame A, and the opposite end is fitted loosely on the rear part of the rod $E^\times$. By this means the finger-bar is attached to the main frame A, and the inner end of said bar is allowed to rise and fall equally as well as the outer end, and it is allowed to conform perfectly to the inequalities of surface over which it may pass. This mode of connection, however, is not new, and it may be seen in various harvesters in use, such as the "Buckeye," for instance.

The novel feature consists in the rod $E^\times$ and the joint $a$, which connects the bar D with the bar E. It will be seen by referring to Fig. 1 that by screwing up the jam-nuts $g\ g$, and thereby depressing the front end of the bar D, that the front edge of the finger-bar, and consequently the front ends of the fingers which are attached to said finger-bar, will be depressed, and by unscrewing the nuts $g\ g$ the front ends of the fingers will be elevated. Thus, by this simple means, the sickle may be made to cut more or less close to the ground, as the nature of the latter will admit, and the adjustment may be made with the greatest facility.

I claim as new—

The rod $E^\times$, in combination with the bars D E, connected by a joint, $a$, when arranged in connection with the finger-bar C and bar G, and all applied to the main frame A, substantially as and for the purpose set forth.

G. W. RICHARDSON.

Witnesses;
A. COREY,
S. M. STALEY.